(12) United States Patent
Latvakoski et al.

(10) Patent No.: US 7,702,760 B2
(45) Date of Patent: Apr. 20, 2010

(54) CONFIGURATION METHOD AND SYSTEM

(75) Inventors: Juhani Latvakoski, Haukipudas (FI); Marko Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 10/472,520

(22) PCT Filed: Mar. 26, 2001

(86) PCT No.: PCT/EP01/03407

§ 371 (c)(1),
(2), (4) Date: Oct. 21, 2003

(87) PCT Pub. No.: WO02/078265

PCT Pub. Date: Oct. 3, 2002

(65) Prior Publication Data
US 2004/0153548 A1 Aug. 5, 2004

(51) Int. Cl.
G06F 15/177 (2006.01)
(52) U.S. Cl. .................. 709/221; 709/217; 709/220
(58) Field of Classification Search ................. 709/221, 709/225–226, 217, 219, 220, 222
See application file for complete search history.

(56) References Cited

U.S. PATENT DOCUMENTS

| | | | | |
|---|---|---|---|---|
| 5,596,723 A * | 1/1997 | Romohr | ...................... | 709/222 |
| 5,873,069 A * | 2/1999 | Reuhl et al. | .................... | 705/20 |
| 5,881,235 A * | 3/1999 | Mills | .......................... | 709/221 |
| 6,130,892 A * | 10/2000 | Short et al. | ................. | 370/401 |
| 6,285,869 B1 * | 9/2001 | Shannon et al. | ............. | 455/411 |
| 6,286,038 B1 * | 9/2001 | Reichmeyer et al. | ........ | 709/220 |
| 6,587,835 B1 * | 7/2003 | Treyz et al. | .................... | 705/14 |
| 6,738,981 B1 * | 5/2004 | Tonnby et al. | ................ | 725/98 |
| 6,807,563 B1 * | 10/2004 | Christofferson et al. | ..... | 709/204 |
| 2001/0003191 A1 * | 6/2001 | Kovacs et al. | ............... | 709/226 |
| 2002/0090932 A1 * | 7/2002 | Bhatia et al. | ................ | 455/412 |
| 2002/0126708 A1 * | 9/2002 | Skog et al. | ................... | 370/522 |

FOREIGN PATENT DOCUMENTS

WO  WO 98/40990  9/1998

OTHER PUBLICATIONS

Henning Schulzrinne and Elin Wedlund, "Application-Layer Mobility Using SIP", Jul. 2000, ACM Press, vol. 4 issue 3.*
C. Perkins, "RFC 2002: IP Mobility Support", Oct. 1996 XP002123919.*
"RFC 2002: IP Mobility Support", C. Perkins, RFC, Oct. 1996, XP002123919.
Specification of the Bluetooth—Wireless Connections Made Easy; Version 1.0B; 1999.

* cited by examiner

*Primary Examiner*—Yemane Mesfin
*Assistant Examiner*—Mohamed Ibrahim
(74) *Attorney, Agent, or Firm*—Alston & Bird LLP

(57) ABSTRACT

The present invention relates to a configuration method and system for providing a configuration parameter, such as a server, gateway or proxy server address(es), to a terminal device. A trigger control information defining trigger events and/or conditions is loaded to the terminal device (11, 21) and a discovery procedure for obtaining the configuration parameter(s) is initiated when at least one of the trigger events and/or conditions is detected. Thereby, a user-friendly automatic configuration of services or server addresses can be provided to a moving mobile terminal.

24 Claims, 2 Drawing Sheets

US 7,702,760 B2

CONFIGURATION METHOD AND SYSTEM

FIELD OF THE INVENTION

The present invention relates to a method and system for providing a configuration parameter such as an address of a data source, e.g. a server, a gateway or a proxy server, to a terminal device.

BACKGROUND OF THE INVENTION

Discovery procedures are required to discover addresses or other configuration parameters of data sources or servers for providing services to a terminal device or client. According to the Dynamic Host Configuration Protocol (DHCP), as specified in the Internet Engineering Task Force Request For Comments (IETF RFC) 2608, a dynamic allocation of network addresses is defined, where temporary or permanent network (IP) addresses are allocated to hosts. The basic mechanism for the dynamic allocation of network addresses is simple. A client requests the use of an address for some period of time. The allocation mechanism guarantees not to reallocate that address within the requested time and attempts to return the same network address each time the client requests an address. To achieve this, the client broadcasts a DHCP discover message which is passed on to DHCP servers not on the same physical subnet. Each server may then respond with a DHCP offer message that includes an available network address and/or other configuration parameters. The client receives one or more DHCP offer messages from one or more servers and may choose one server from which to request configuration parameters, based on the configuration parameters offered in the received DHCP offer messages. Then, the client broadcasts a DHCP request message including the server identifier to indicate which server it has selected, such that those servers not selected by the DHCP request message may use the message as a notification that the client has declined that servers offer. The server selected in the DHCP request message commits the binding for the client to persistent storage and response with a DHCP acknowledge message containing the configuration parameters for the requesting client.

According to the Domain Name Server (DNS) protocol specification as defined e.g. in the IETF RFC 1035, domain names are used as arguments to a local agent, called a resolver, which retrieves information associated with the domain name. Thus, a user might ask for the host address or mail information associated with a particular domain name. To enable the user to request a particular type of information, an appropriate query type is passed to the resolver with the domain name. The resolver is responsible for hiding the distribution of data among name servers from the user. The resolver starts with knowledge of at least one name server. When the resolver processes a user query it asks a known name server for the information. In return, the resolver either receives the desired information or a referral to another name server. Using these referrals, resolvers learn the identities and contents of other name servers. Resolvers are responsible for dealing with the distribution of the domain space and dealing with the effects of name server failure by consulting redundant data bases in other servers.

Previously, the internet server systems and thus also their configuration parameters (e.g. addresses) have been quite stable and they have been configured manually based on user specific settings to the terminal. However, in the case of wireless Internet, for example WLANs (Wireless Local Area Networks), the configuration using DHCP and DNS protocols does not take into consideration wide area cellular type rapid mobility. In particular, a mobile station or mobile terminal may send a DHCP query in order to find an IP address of a P-CSCF (Proxy Call State Control Function) or some other service lookup server. The DHCP server in the network answers with a P-CSCF address. Then, the mobile terminal contacts the P-CSCF in order to get a list of available multimedia services. The P-CSCF can take into account the type of network to which it is contacted, so that not all of the services designed for the PS (Packet-Switched) domain may technically be possible in the CS (Circuit-Switched) domain for example because of the low capacity of the CS network. The P-CSCF answers with a list of services which are now available to the user.

In mobile Internet, the dynamic configuration of the configuration parameters (e.g. server addresses) should be adapted to the movements of the mobile terminal. Solutions for such a dynamic service configuration are provided by the Service Location Protocol (SLP) specified in the ITEF RFC 2608, which provides a scalable framework for discovery and selection of network services. A user agent which is a process working on the users behalf to establish contact with some service by retrieving service information from service agents or directory agents performs discovery by issuing service request messages. Furthermore, a Service Discovery Protocol (SDP) is specified in the Bluetooth Specification Version 1.0 B issued on 29. November 1999 by the Bluetooth Forum, where a service discovery mechanism is provided as a means for client applications to discover the existence of services provided by server applications as well as the attributes of those services. The attributes or configuration parameters of a service include the type or class of service offered and the mechanism or protocol information needed to utilize the service. A set of SDP server available to an SDP client can change dynamically based on the RF (Radio Frequency) proximity of the servers to the client. When a server becomes available, a potential client must be notified that the client can use SDP to query the server about its services. Similarly, when a server leaves proximity or becomes unavailable for any reason, the client may use SDP to poll the server and may infer that the server is not available if it no longer response to requests.

However, these known dynamic service configuration procedures do not provide an automatic server address configuration or reconfiguration procedure and a service configuration customization mechanism.

When a mobile terminal moves across the radio, network and service area coverage, it is a problem for the user to manually configure server or proxy server addresses. In practice, it is almost impossible to configure the addresses manually, because the user cannot be aware of the current service configuration of the operator. This is especially true when localized area specific servers of a visited operator are considered. For example, a user is abroad and wants to find out special offers of local restaurants and the like. Thus, an automatic and operator specific service configuration is highly desirable.

SUMMARY OF THE INVENTION

It is therefore an object of the present invention to provide a method and system for providing a configuration parameter to a terminal device, by means of which an automatic and operator specific service configuration can be achieved.

This object is achieved by a method for providing a configuration parameter of a data source to a terminal device, said method comprising the steps of:

loading a trigger control information into the terminal device, the trigger control information defining trigger events and/or conditions; and initiating a discovery procedure for obtaining the configuration parameter when at least one of the trigger events and/or conditions is detected.

Furthermore, the above object is achieved by a system for providing a configuration parameter of a data source to a terminal device, wherein a network to which the terminal device is connected is arranged to load a trigger control information defining trigger events and/or conditions into the terminal device, and wherein the terminal device is arranged to initiate a discovery procedure for obtaining the configuration parameter when at least one of the trigger event and/or conditions is detected.

Additionally, the above object is achieved by a terminal device for a cellular network, comprising storing means for storing a trigger control information defining trigger events and/or conditions; and trigger means for initiating a discovery procedure for obtaining a configuration parameter when at least one of the trigger events and/or conditions is detected.

Accordingly, a new configuration or reconfiguration mechanism and procedure for server address discovery is provided, where the trigger control information defines event and/or conditions which shall trigger the discovery procedure of configuration parameters, such as server addresses, to be executed. When a triggering event or condition comes true, the procedure is started to get new configuration parameters of servers or proxy servers and their services from the network to be used by the terminal device. Thereby, a user-friendly automatic configuration of server or proxy server addresses or other service configuration parameters can be provided to the user terminal.

The terminal device may be a mobile terminal and the data source may be any server or proxy server for providing a service to the mobile terminal.

The configuration parameter may be an address of a WWW proxy, a WAP gateway, a WAP push server, a proxy VoIP and Multimedia CSCF server, a localized service area specific server or a defined geographical area specific server.

Preferably, the trigger control information may be stored in a SIM (Subscriber Identity Module) or USIM (UMTS SIM) card or a volatile memory of the terminal device. Thereby, an initial operator specific configuration can be provided when the SIM or USIM card is inserted into the terminal device.

The network may be arranged to load the trigger control information into the terminal device by an updating procedure using a SIM application. Thus, the initial trigger control information can be updated based on a change in the network environment due to a movement of the terminal device.

Furthermore, the trigger control information may be broadcast by the network in a system information message.

Additionally, the network may be arranged to deliver the trigger control information to the terminal device in a dedicated manner when the terminal device registers to the network. In this case, the trigger control information may be delivered together with server addresses, according to the related user profile or as a part of it, using any signalling protocol, such as DHCP, SM, SLP or SIP (Session Initiation Protocol) for example.

The trigger control information may be interpreted by the terminal device, and the defined service configuration triggers may be stored in the cellular terminal device.

The discovery procedure may comprise a request for new server addresses from the network, and the new server addresses may be delivered to the terminal device by a service configuration response message.

The trigger events and/or conditions may comprise at least one of a cell update, a routing area update, a location area update, a change in the IP network point of attachment, a localized service area change, a defined geographical area change, a location of all mobiles in geographical area change, a roaming, and a movement outside a predefined geographical area.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

The preferred embodiment will now be described on the basis of a mobile terminal connected to a cellular network such as a 3rd generation mobile communication network comprising a circuit-switched core network and a packet-switched core network.

In the context of the present invention, a service is understood to be any entity that can provide information, perform an action, or control a resource on behalf of another entity. A service may be implemented as software, hardware, or a combination of hardware and software. Furthermore, the term proxy is used to indicate any mechanism whereby one system "fronts for" another system in responding to protocol requests. Proxy systems or servers are used in network management to avoid having to implement full protocol stacks in simple devices, such as modems.

Figure 1:
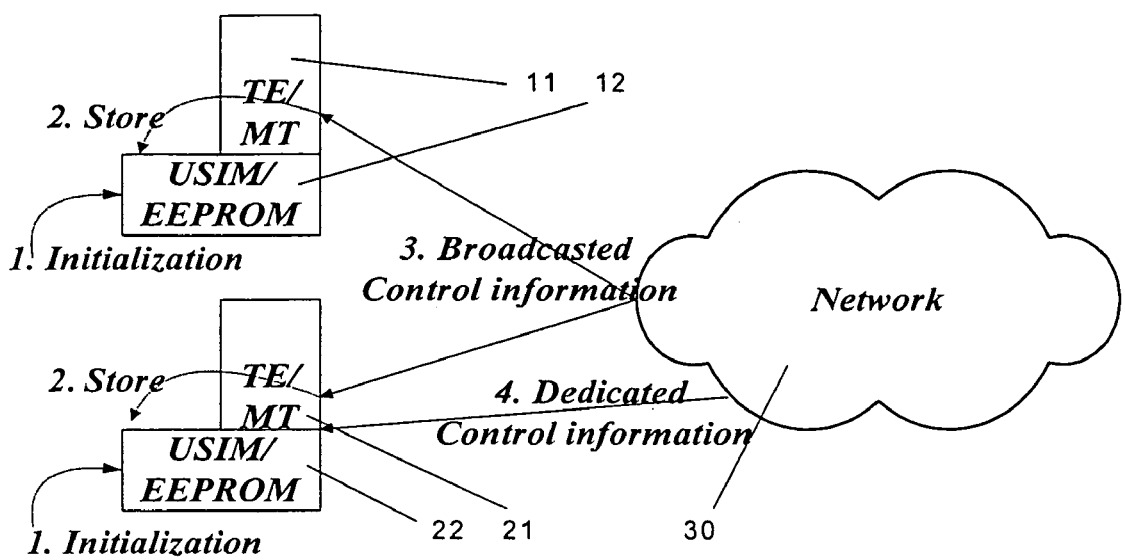
FIG. 1 shows a schematic diagram indicating initialization, storing and changing of a trigger control information in a terminal device in according to the preferred embodiment.

FIG. 1 shows a schematic diagram of an initialization, storing and changing procedure of a trigger control information. The operator of a network 30 may define available or used service configuration triggers and may provide them as a trigger control information to a first terminal equipment or mobile terminal 11 and a second terminal equipment or mobile terminal 21. These mobile terminals 11, 21 comprise a USIM (Universal Mobile Telecommunications System Subscriber Identity Module) or non-volatile memory 12, 22, e.g. an BEPROM (Electrically Erasable Programmable Read-Only-Memory), in which the trigger control information can be stored. The trigger control information defines events and/or conditions, which shall trigger a server address discovery procedure or any other procedure for obtaining configuration parameters of servers or other data sources, to be executed. The server addresses can be addresses of a WWW (World Wide Web) proxy, a WAP (Wireless Application Protocol) gateway, a WAP push server, a proxy VoIP (Voice over IP) and Multimedia CSCF server, a localized service area specific server, a defined geographical area specific server etc.

When a triggering event or condition comes true, e.g. is detected by the first mobile terminal 11 and/or the second mobile terminal 21, a configuration or reconfiguration procedure is started to get new server addresses or other configuration parameters from the network 30 to be used by the terminal. A control information can be initialized, changed and stored in the following ways, depending on the operator and user needs and an agreement between them:

In step 1, the operator of the network 30 can initialize the trigger control information and store it in the USIMs 12, 22 of the first and second mobile terminals 11, 21 when the USIM card is sold to the customer. Then, it can be updated later e.g. by using a SIM application tool kit or other similar solutions. As an alternative, the trigger control information can be stored in the non-volatile memory (e.g. EEPROM) of the first and second terminals 11, 21. In any case, the operator can allow a user to change the trigger control information and/or the operator can also change it using the mechanisms described in step 3 and/or step 4.

In step 2, the changed trigger control information is then stored in the USIMs or BEPROM 12, 22 of the first and second mobile terminals 11, 21.

As indicated by step 3, the operator may broadcast changes in the trigger control information as a part of a system information message. This is a particularly applicable when the trigger control information of a plurality of mobile terminals registered to the network 30 is to be controlled.

As an alternative or in addition thereto, step 4 indicates a provision of the trigger control information to a second mobile terminal 21 in a dedicated manner, when the second mobile terminal 21 registers to the network 30. This may be achieved e.g. during the delivery of server addresses to the second mobile terminal 21 according to a user profile or as a part of it using any signalling protocol, such as DHCP, SM (session/service management), SLP or SIP for example.

Thus, the first and second mobile terminals 11, 21 are continuously provided with an updated trigger control information adapted to their current location. The address or other configuration parameter discovery procedure may be performed as follows. When the mobile terminal detects or determines a trigger event or trigger condition as defined by the stored trigger control information, it may send a SLP query in order to obtain an IP address of a WWW proxy or some other required proxy server. Also DHCP query may be triggered in order to obtain an IP address of a respective CSCF or some other service lookup server. For example, when a PS mobile terminal enters a (new) CS network, the queried DHCP server answers with a P-CSCF address. The mobile terminal may then contact the P-CSCF in order to get a list of available multimedia services. The P-CSCF can take into account the type of network where it is connected, so that not all, of the services designated for the PS domain may technically be possible in the CS domain, e.g. due to the low capacity of the CS network. The P-CSCF answers with a corresponding list of services, such that the user of the mobile terminal is now provided with a list of services available in the network.

It is noted that the any of the initially described discovery procedures, e.g. according to the DHCP or DNS protocol or SLP protocol, or other discovery protocols may be used for obtaining the required address or other configuration parameters.

Figure 2:
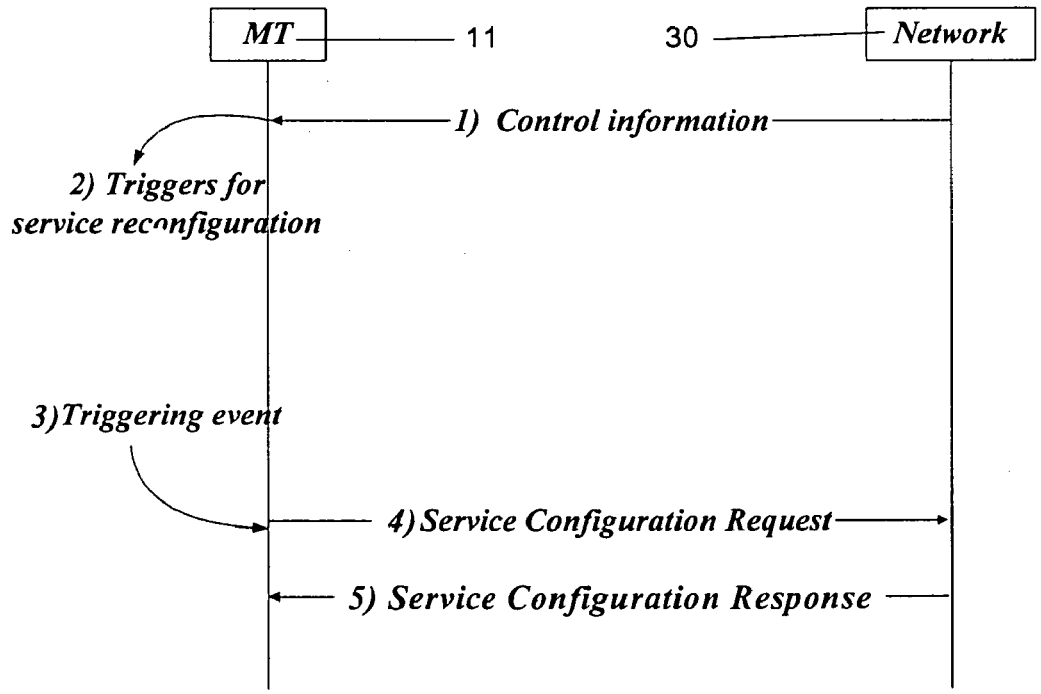
FIG. 2 shows a signaling diagram indicating a service configuration procedure according to the preferred embodiment.

FIG. 2 shows a signaling diagram of a service configuration procedure between the first mobile terminal 11 and the network 30. In step 1, the trigger control information is provided for the mobile terminal 11 by the network. This control information is then interpreted in step 2 by the mobile terminal 11, and the defined service configuration triggers are then stored in the volatile memory and/or the USIM 21 of the mobile terminal 11. In step 3, a triggering event happens or location conditions come true, as defined by the trigger control information, and a service configuration or reconfiguration procedure is started by the mobile terminal 11. Thus, the mobile terminal 11 issues a service configuration request in step 4 so as to ask for new server addresses or other configuration parameters from the network 30. In step 5, the new server addresses or other configuration parameters are delivered to the mobile terminal 11 by a service configuration response message.

The operator of the network 30 may select the most suitable triggers for service configuration or reconfiguration based on his own needs, i.e. service configuration customization, and may define them in the referred trigger control information. As an example, the following events or conditions can be defined as triggers:

1. a cell update where a new cell is entered,
2. a routing area update where a new routing area of a PS domain is entered,
3. a location area update where a new location area of a CS domain is entered,
4. a change in the IP network point of attachment, e.g. change of GGSN (Gateway General Packet Radio Services Support node) or HA (Home Agent),
5. a change of a Localized Service Area (LSA), which is an operator-defined area, for which specific access conditions apply and which may correspond to an area in which the core network offers specific services,
6. a change of a Defined Geographical Area (DEGA),
7. a change of the Location of All Mobiles in Geographical Area (LAMGA),
8. a roaming from a first PLMN to a second PLMN, by which also the operator is changed, and
9. a movement outside a predefined geographical area, which may include position definition functions, e.g. Global Positioning System (GPS) etc., in the mobile terminal 11 or the network 30.

Of course other suitable trigger events and/or conditions associated with a terminal movement or change of location can be defined.

Figure 3:
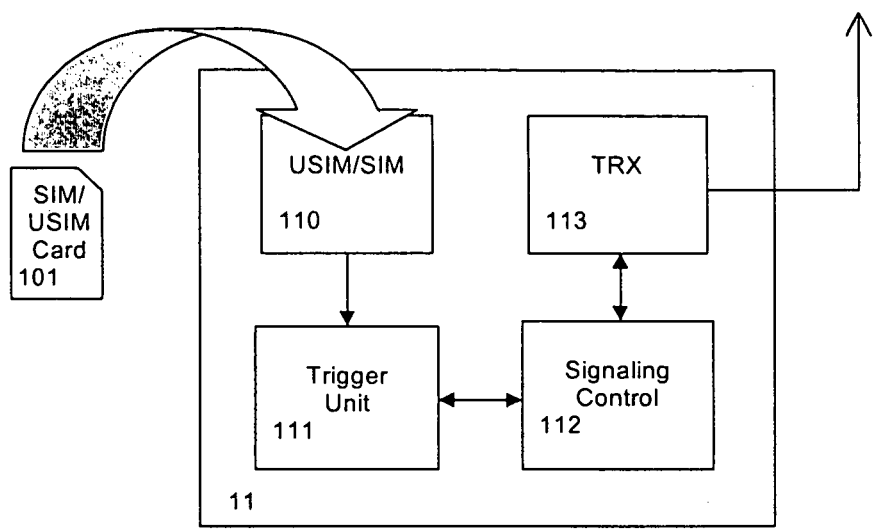
FIG. 3 shows a schematic block diagram of a terminal device according to the preferred embodiment.

FIG. 3 shows a schematic block diagram of the mobile terminal 11. It is noted that only those functions relevant for the present invention are shown in FIG. 3. The mobile terminal 11 comprises a transceiver (TRX) 113 for transmitting and receiving RF signals to/from the network 30. The TRX 113 is controlled by a signaling control unit 112 which is arranged to generate and interpret signaling messages transmitted to and received from the network 30, respectively. The signaling control unit 112 is controlled by a trigger unit 111 based on the trigger control information received from the network 30. An initial configuration or setting of the trigger events and/or conditions may be obtained when a SIM or USIM card 101 is inserted into a USIM or SIM unit 110. The trigger control information of the SIM/USIM card 101 may then be interpreted in the USIM or SIM unit 110, and the corresponding trigger events and/or conditions may be supplied to the trigger unit 111. Based on a corresponding signaling of the signaling control unit 112, which indicates the receipt or detection of messages or other events and conditions, e.g. the triggers indicated above, the trigger unit 111 may then decide whether to initiate a discovery procedure for obtaining the required configuration parameters, e.g. server addresses of a server or proxy server.

Furthermore, the signaling control unit is arranged to perform or initiate an update procedure when the trigger control information is received from the network 30 together with a broadcast signaling message or a response message to a network registration procedure.

It is to be noted that the units or blocks 110 to 112 may be implemented as concrete hardware circuits or as software routines of a corresponding control processor arranged in the mobile terminal 11.

Figure 4:
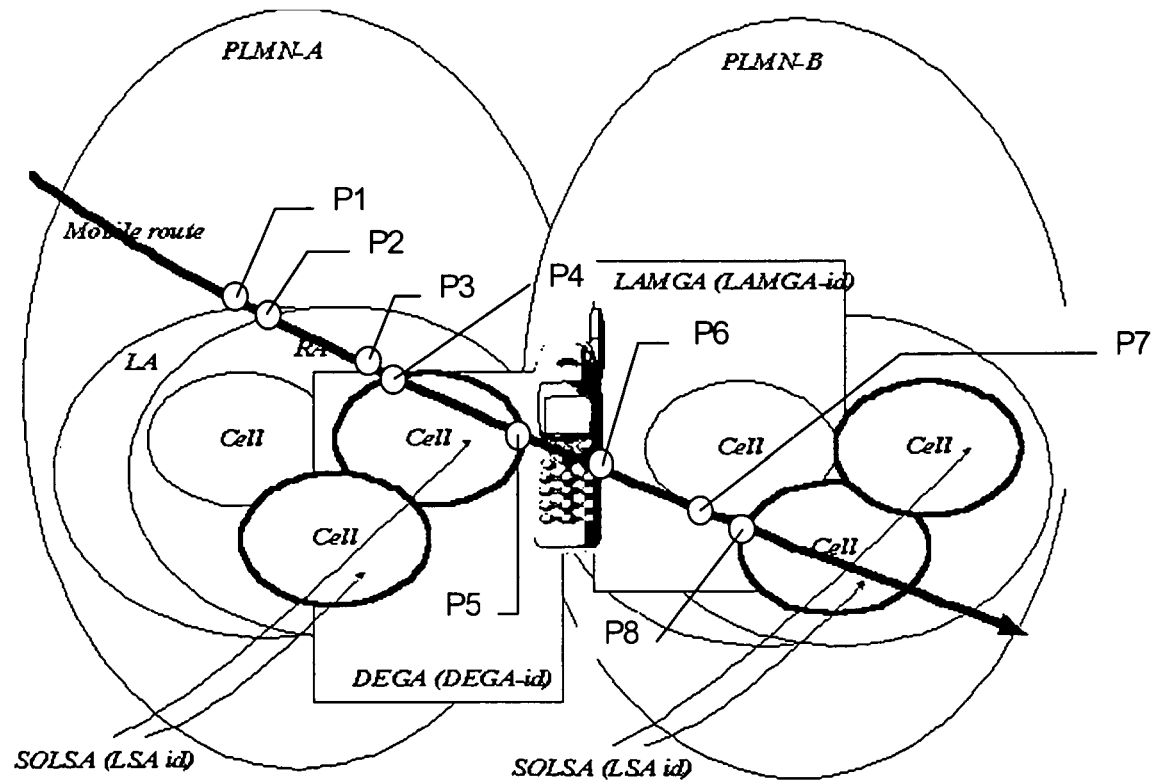
FIG. 4 shows an example of a route of a mobile terminal and associated trigger events.

The network operator may also define multiple triggers to be used. An example of such a case is shown in FIG. 4. FIG. 4 shows a moving route of a mobile terminal through a network configuration comprising a first network PLMN-A and a second network PLMN-B. Both networks comprise location areas LA, routing areas RA and individual cells. Some of the individual cells are combined to a localized service area SOLSA with a specific LSA identity. Furthermore, a defined geographical area (DEGA) with a predetermined DEGA identity and a location of all mobiles in geographical area (LAMGA) with a predetermined LAMGA identity are provided. When the mobile terminal moves according to a route indicated by the arrow in FIG. 4, service reconfiguration procedures may be activated several times at predetermined locations indicated on the arrow.

At a first location P1, a location area update is signaled by the signaling control unit 112. Then, at a location P2, a routing area update is signaled. Moreover, at the location P3, a DEGA change is signaled, and at the location P4 an LSA change is signaled. When the mobile terminal enters the second network PLMN-B, an operator change is detected due to the roaming from the first network PLMN-A to the second PLMN-B. This may include a deregistration from the operator of the first network PLMN-A and a registration to the operator of the second network PLMN-B. This may be accompanied by an initial service configuration. At the location P6, a LAMGA change is detected, and a cell update is signaled at the location P7. Finally, an additional LSA change is detected at the location P8.

Based on the trigger control information and the corresponding registered trigger events and/or conditions, a service configuration or reconfiguration procedure may be activated at predetermined ones or each of the above locations P1 to P8.

It is noted that some of the above changes, updates may also trigger a change in the service provider. This is the case, when the network operator has rent a service area from one company and the other service area from another company. Thus, the service configuration procedure according to the present invention also enables a user-friendly management of services in future mobile Internet systems as specified e.g. in the 3GPP (3rd Generation Partnership Project) standard specifications.

It is noted that the present application is not restricted to the above preferred embodiment, but can be applied in any network architecture, where service configuration parameters have to be downloaded or transmitted from the network to a terminal device. Furthermore, any desired trigger event and/or condition can be used for activating the discovery procedure. The preferred embodiment may thus vary within the scope of the attached claims.

The invention claimed is:

1. A method, comprising:
   loading a trigger control information provided by a network into a terminal device connected to said network, said trigger control information defining trigger events or conditions;
   interpreting, by the terminal device, said trigger control information to determine the trigger events or conditions defined by said trigger control information;
   storing the determined trigger events or conditions defined by the interpreted trigger control information in a memory of the terminal device;
   initiating a discovery procedure at said terminal device for obtaining a configuration parameter used to identify a source of available multimedia services when at least one of said stored trigger events or conditions is detected, wherein said discovery procedure comprises causing a request for new server addresses from said network to be transmitted, and receiving a service configuration response message comprising said new server addresses; and
   receiving a list of available multimedia services based on the discovery procedure, and
   wherein said loading the trigger control information comprises initializing the trigger control information by loading trigger control information stored on a subscriber identity module card or on a universal mobile telecommunications system subscriber identity module card in response to insertion of the subscriber identity module card or the universal mobile telecommunications system subscriber identity module card into said terminal device.

2. A method according to claim 1, wherein said terminal device comprises a mobile terminal and said data source comprises a server configured to provide a service to said mobile terminal.

3. A method according to claim 2, wherein said configuration parameter comprises an address of a server, a gateway or a proxy server.

4. A method according to claim 1, wherein said discovery procedure comprises an address discovery procedure according to a dynamic host configuration protocol, domain name server protocol or service location protocol or some other discovery protocol.

5. A method according to claim 1, wherein said loading the trigger control information comprises an updating procedure using a subscriber identity module application for updating said trigger control information.

6. A method according to claim 1, wherein said trigger control information is stored in a non-volatile memory of said terminal device.

7. A method according to claim 1, further comprising receiving at least a portion of said trigger control information in a system information message broadcast from a network of said data source to said terminal device.

8. A method according to claim 1, wherein at least a portion of said trigger control information is delivered to said terminal device when said terminal device registers to said network.

9. A method according to claim 8, wherein said at least a portion of said trigger control information is delivered in a dedicated manner into said terminal device together with server addresses according to a user profile or a part of said user profile using a signalling protocol.

10. A method according to claim 1, wherein the at least one of said trigger events or conditions comprise at least one of a cell update, a routing area update, a location area update, a change in the IP network point of attachment, a localized service area change, a defined geographical area change, a location of all mobiles in geographical area change, roaming, or a movement outside a predefined geographical area.

11. A system, comprising a network and a terminal device connected to the network, wherein:
   the network is configured to load a trigger control information defining at least one of trigger events or conditions into said terminal device; and
   said terminal device is configured to interpret said trigger control information to determine the at least one of trigger events or conditions defined by said trigger control information, store the determined at least one of trigger events or conditions defined by the interpreted trigger control information in a memory of the terminal device, initiate a discovery procedure to obtain a configuration parameter used to identify a source of available multimedia services when at least one of said trigger events or conditions is detected, and configured to receive a list of available multimedia services based on the discovery procedure, wherein said discovery procedure comprises causing a request for new server addresses from said network to be transmitted, and receiving a service configuration response message comprising said new server addresses, and wherein said trigger control information is loaded from a subscriber identity module or universal mobile telecommunications system subscriber identity module card which is stored in said terminal device.

12. A system according to claim 11, wherein said terminal device comprises a mobile terminal and said data source comprises a server configured to provide a service to said mobile terminal.

13. A system according to claim 11, wherein said configuration parameter comprises an address of a server, a gateway or a proxy server.

14. A system according to claim 11, wherein said trigger control information is stored in a non-volatile memory of said terminal device.

15. A system according to claim 11, wherein said network is configured to load said trigger control information into said terminal device by an updating procedure using a subscriber identity module application.

16. A system according to claim 11, wherein said network is configured to broadcast said trigger control information in a system information message.

17. A system according to claim 11, wherein said network is configured to deliver said trigger control information to said terminal device when said terminal device registers to said network.

18. An apparatus comprising a terminal device, the terminal device comprising:

a memory configured to store a trigger control information defining trigger events or conditions, wherein said trigger control information is provided for said terminal device by a network to which the terminal device is connected; and a trigger configured to initiate a discovery procedure to obtain a configuration parameter used to identify a source of available multimedia services when at least one of said trigger events or conditions is detected, wherein said discovery procedure comprises causing a request for new server addresses from said network to be transmitted and receiving a service configuration response message comprising said new server addresses, and wherein the memory is further configured to receive a list of available multimedia services based on the discovery procedure, and wherein the memory configured to store said trigger control information comprises a subscriber identity module or universal mobile telecommunications system subscriber identity module card which is stored in said terminal device, and wherein said trigger control information is interpreted by the terminal device within the memory to determine the trigger events or conditions defined by said trigger control information, and wherein the memory is further configured to store the determined trigger events or conditions defined by the interpreted trigger control information.

19. An apparatus according to claim 18, wherein said memory comprises one or more of a universal mobile telecommunications system subscriber identity module or subscriber identity module card or a non-volatile memory.

20. An apparatus according to claim 19, further comprising an updater configured to update said stored trigger control information in response to a new trigger control information received from said network in a broadcast system control information or together with server addresses in a network registration procedure.

21. An apparatus, comprising:

storing means for storing a trigger control information defining trigger events or conditions, wherein said trigger control information is provided for said terminal device by a network to which the terminal device is connected; and trigger means for initiating a discovery procedure for obtaining a configuration parameter used to identify a source of available multimedia services when at least one of said trigger events or conditions is detected, wherein a list of available multimedia services is received in the storing means based on the discovery procedure, and wherein said discovery procedure comprises causing a request for new server addresses from said network to be transmitted, and receiving a service configuration response message comprising said new server addresses, and wherein said storing means comprises a subscriber identity module or universal mobile telecommunications system subscriber identity module card which is stored in said terminal device, and said trigger control information is interpreted by the terminal device within the storing means to determine the trigger events or conditions defined by said trigger control information, and wherein the storing means is further configured to store the determined trigger events or conditions defined by the interpreted trigger control information.

22. An apparatus comprising a terminal device, the terminal device comprising at least one processor and at least one memory storing computer program code, wherein the at least one memory and stored computer program code are configured to, with the at least one processor, cause the apparatus to at least:

provide for storage of a trigger control information defining trigger events or conditions on a subscriber identity module or universal mobile telecommunications system subscriber identity module card stored in said terminal device, wherein said trigger control information is provided for said terminal device by a network to which said terminal device is connected;

interpret said trigger control information to determine the trigger events or conditions defined by said trigger control information;

store the determined trigger events or conditions defined by the interpreted trigger control information; and initiate a discovery procedure to obtain a configuration parameter used to identify a source of available multimedia services when at least one of said trigger events or conditions is detected, wherein the at least one memory and stored computer program code are configured to, with the at least one processor, further cause the apparatus to receive a list of available multimedia services based on the discovery procedure, and wherein said discovery procedure comprises the at least one memory and stored computer program code are configured to, with the at least one processor, causing the apparatus to:

provide for transmission of a request for new server addresses from said network; and receive a service configuration response message comprising said new server addresses.

23. A computer readable medium storing a computer program, said computer program configured to control a processor to perform:

loading a trigger control information provided by a network into a terminal device connected to said network, said trigger control information defining trigger events or conditions, wherein said trigger control information is provided for said terminal device by said network to which said terminal device is connected, and wherein said loading the trigger control information comprises initializing the trigger control information by loading trigger control information stored on a subscriber identity module card or on a universal mobile telecommunications system subscriber identity module card in response to insertion of the subscriber identity module card or the universal mobile telecommunications system subscriber identity module card into said terminal device;

interpreting said trigger control information at the terminal device to determine the trigger events or conditions defined by said trigger control information;

provide for storage of the determined trigger events or conditions defined by the interpreted trigger control information in the terminal device;

initiating a discovery procedure at said terminal device for obtaining a configuration parameter used to identify a source of available multimedia services when at least one of said trigger events or conditions is detected, wherein said discovery procedure comprises:

provide for transmission of a request for new server addresses from said network; and receiving a service configuration response message comprising said new server addresses; and receiving a list of available multimedia services based on the discovery procedure.

24. A method according to claim 9, wherein said signaling protocol comprises dynamic host configuration protocol, session/service management protocol, service location protocol, or session initiation protocol.

* * * * *

UNITED STATES PATENT AND TRADEMARK OFFICE
CERTIFICATE OF CORRECTION

PATENT NO. : 7,702,760 B2  
APPLICATION NO. : 10/472520  
DATED : April 20, 2010  
INVENTOR(S) : Latvakoski et al.

Page 1 of 1

It is certified that error appears in the above-identified patent and that said Letters Patent is hereby corrected as shown below:

Title page,
Item (75) Inventors, "Oulu (FI)" should read --Fleet (GB)--.

Column 4,
Line 54, "BEPROM" should read --EEPROM--.

Column 5,
Line 19, "BEPROM" should read --EEPROM--.

Signed and Sealed this
Nineteenth Day of July, 2011

David J. Kappos
*Director of the United States Patent and Trademark Office*